United States Patent
Groult et al.

[11] 3,897,390
[45] July 29, 1975

[54] POLYSILOXANE COMPOUNDS HAVING AN ADAMANTANE BASE, AND METHODS OF PRODUCTION THEREOF

[75] Inventors: Alain Maurice Groult, Annemasse, France; Günter G. Bellmann, Geneva, Switzerland

[73] Assignee: Etat Francais, Paris Armees, France

[22] Filed: May 23, 1974

[21] Appl. No.: 472,885

[30] Foreign Application Priority Data
May 25, 1973 France .............................. 73.19024

[52] U.S. Cl. ...... 260/46.5 R; 260/46.5 E; 260/47 R
[51] Int. Cl.[2] ......................................... C08G 77/18
[58] Field of Search ......... 260/46.5 R, 46.5 E, 47 R

[56] References Cited
UNITED STATES PATENTS
3,666,718   5/1972   Patterson et al. ............... 260/46.5 E
3,699,135  10/1972   Baptista et al. ................. 260/46.5 E Primary Examiner—Melvyn I. Marquis
Attorney, Agent, or Firm—Waters, Schwartz & Nissen

[57] ABSTRACT

Polysiloxane compounds constituted by recurrent units forming macromolecular chains and having the following general formula

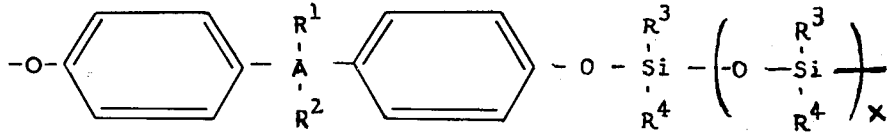

where A is an adamantyl group, $R_3$ and $R_4$ each is an alkyl, alkenyl or aryl group, $R_1$ and $R_2$ each is hydrogen, or an alkyl or aryl group, and x is 0 or a whole number, the chain having end groups given by the formulas

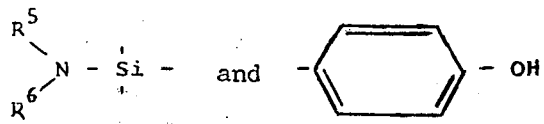

where $R_5$ and $R_6$ each is hydrogen or an alkyl or aryl group. The polysiloxane compounds have excellent thermal stability and the physical properties of a thermoplastic material. They are easily cured by hot or cold vulcanization either in their initial state or after a suitable preparatory treatment to obtain elastomeric properties.

10 Claims, No Drawings

POLYSILOXANE COMPOUNDS HAVING AN ADAMANTANE BASE, AND METHODS OF PRODUCTION THEREOF

BACKGROUND a. Field of the Invention

The invention relates to polysiloxane compounds which have thermal stability and elastomeric properties.

b. Prior Art

Thermostable, elastomeric material is already known; among these are silicone rubbers (polysiloxanes) which are most similar to the polysiloxanes of the invention by both their chemical composition and their properties.

The thermostability and especially the mechanical properties of the known thermostable elastomers are insufficient, in practice, when the materials are utilized in the pure state. This is the reason for incorporating diverse additives therein which, although they improve the physical properties and thermostability, have the disadvantage of adversely affecting other properites. In particular, the presence of such additives prevents obtaining thermostable elastomeric materials in the form of bodies which are transparent or at least translucent.

SUMMARY OF THE INVENTION

An object of the invention is to provide a thermoplastic material which is thermostable, translucent, or transparent and which can acquire elastomeric properties by vulcanization.

According to the invention, there are contemplated polysiloxane compounds constituted by recurrent units forming macromolecular chains and having the following general formula

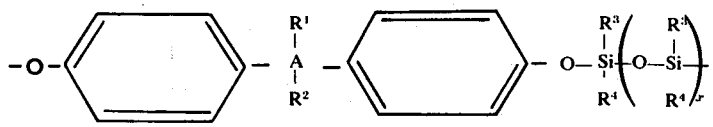

where A is an adamantyl group, $R_3$ and $R_4$ each is an alkyl, alkenyl or aryl group, $R_1$ and $R_2$ each is hydrogen, or an alkyl or aryl group, and x is 0 or a whole number, the chain having end groups given by the formulas

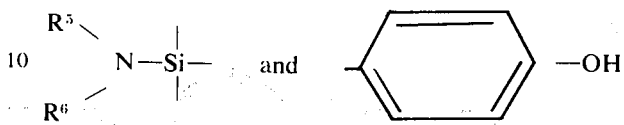

where $R^5$ and $R^6$ each is hydrogen or an alkyl or aryl group.

Such polysiloxane compounds have excellent thermal stability and the physical properties of a thermoplastic material. They are easily cured by hot or cold vulcanization either in their initial state or after a suitable preparatory treatment to obtain elastomeric properties.

It is a feature of the invention that each recurrent polysiloxane unit comprises an adamantyl group, i.e. derived from adamantane (tricyclo [3, 3, 1, 1, 5, 7]decane) said group being connected to the other groups of the recurring unit forming the macromolecular chain either by two carbon atoms in positions 1, 3, or by two carbon atoms in positions 5, 7, the two carbon atoms in 1, 3 position in the latter case being connected to alkyl or aryl substitution groups.

By way of example, the recurrent unit can have one of the following formulas:

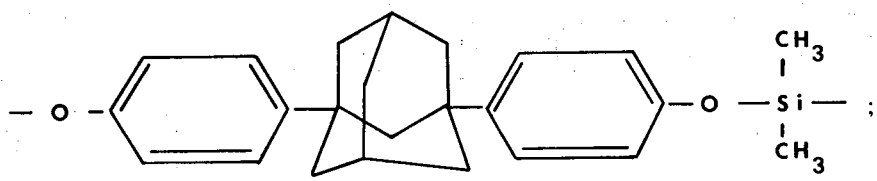

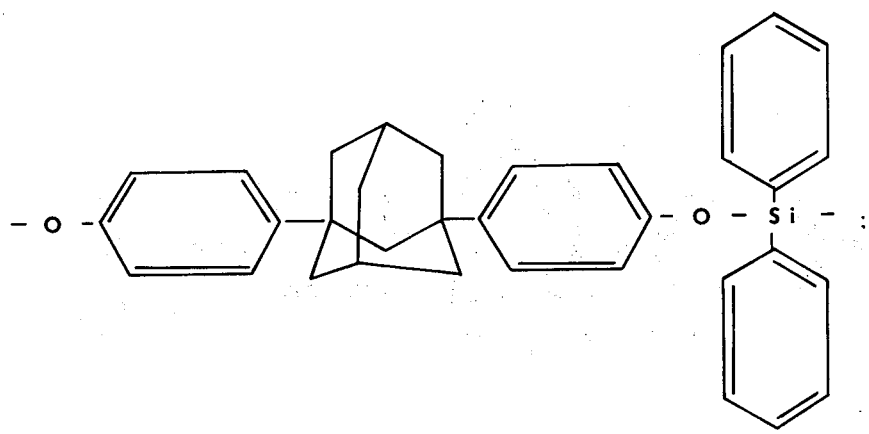

3
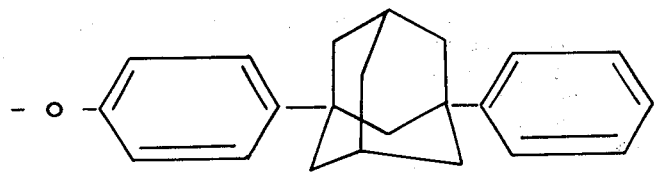
4
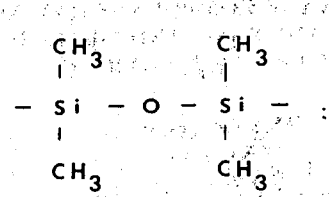
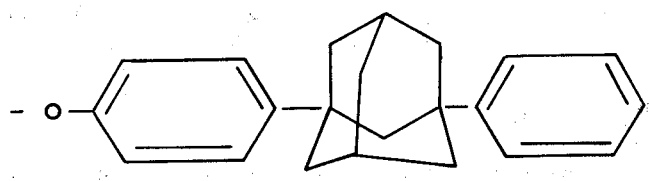
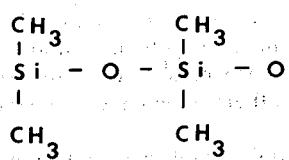
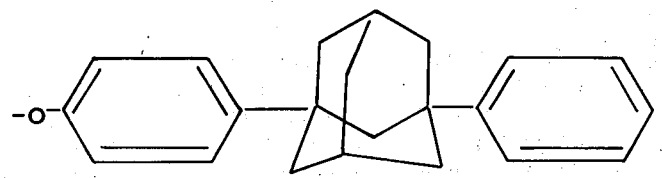
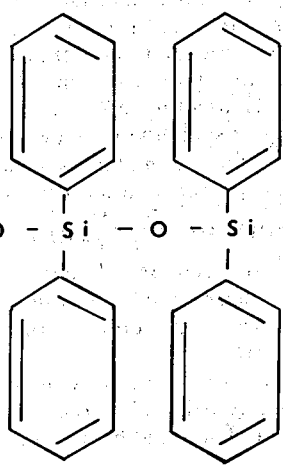
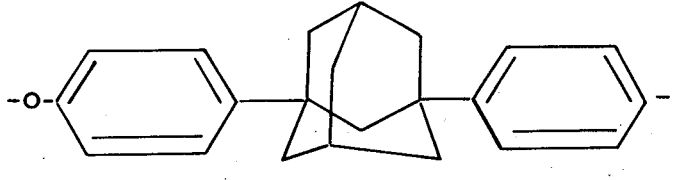
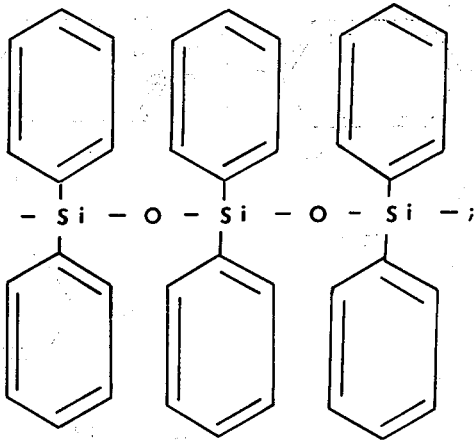
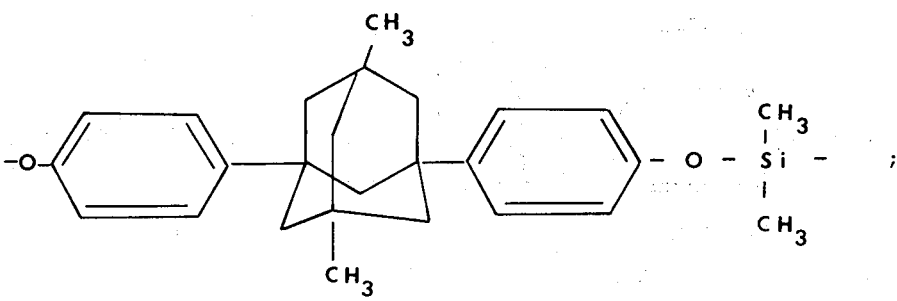

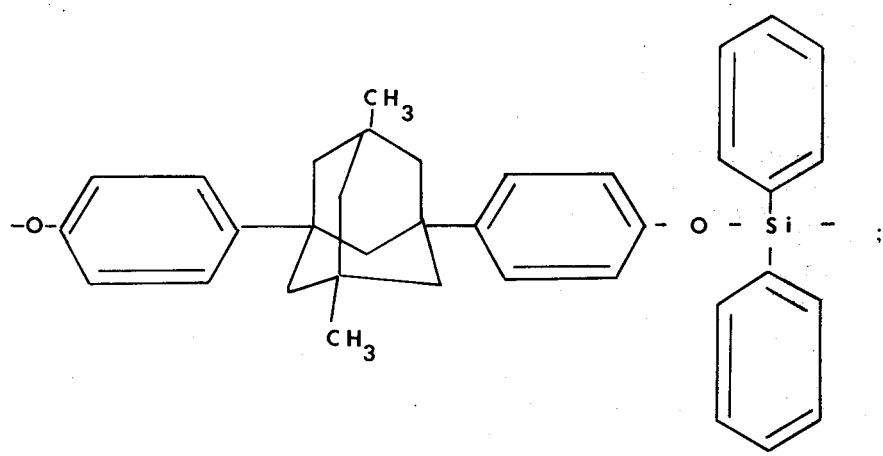
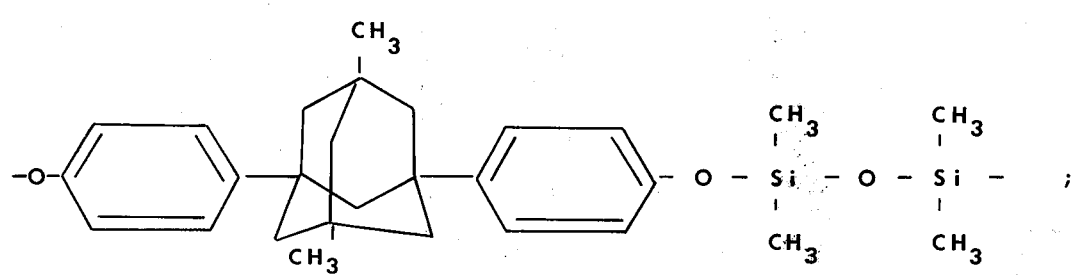
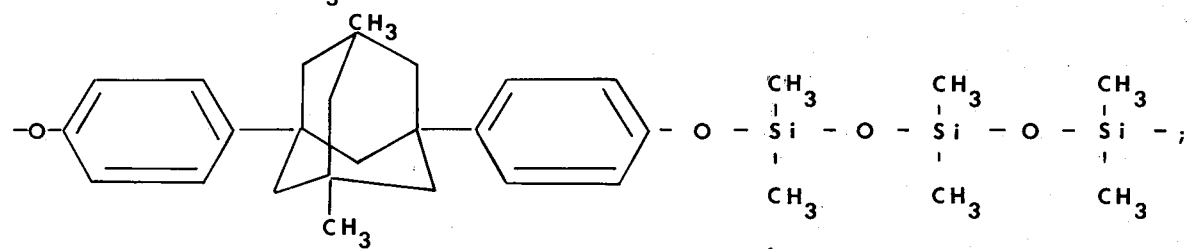
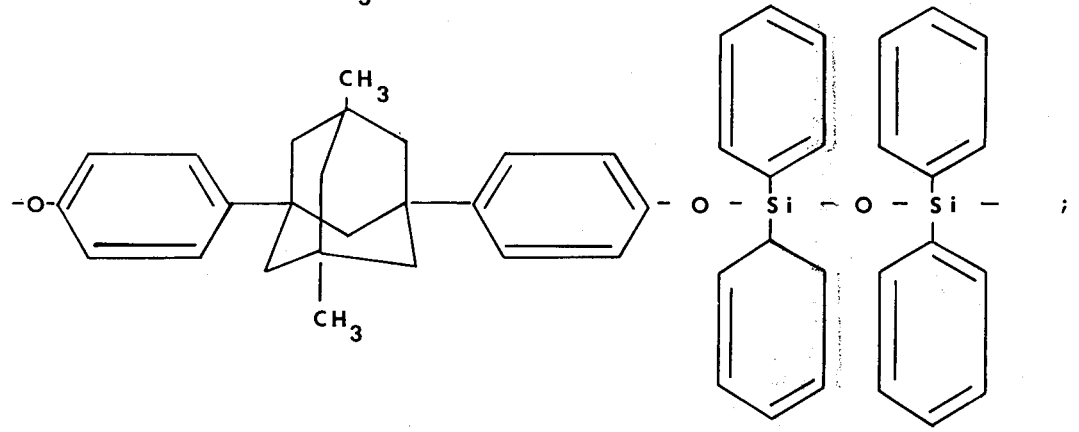
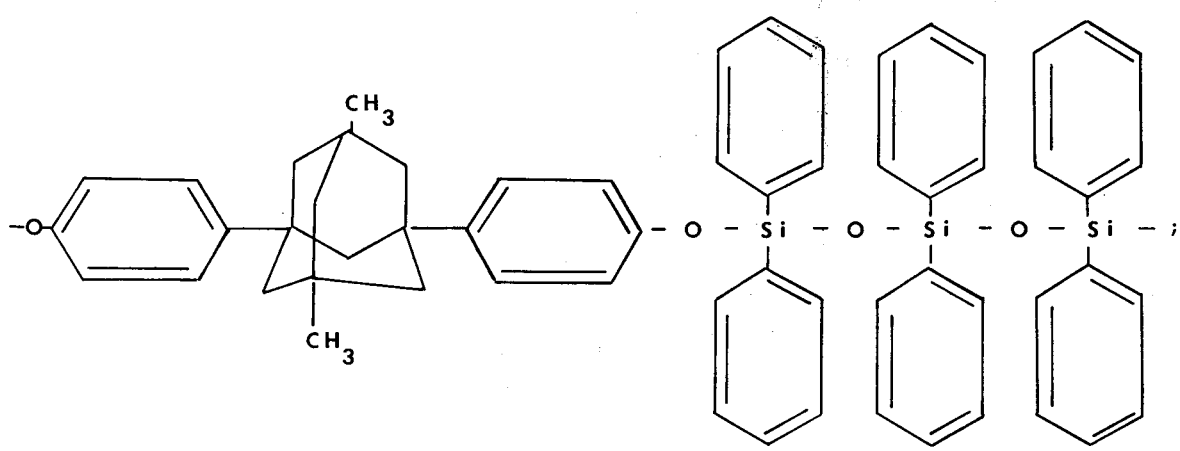

The polysiloxane according to the invention is soluble either cold or hot in certain organic or mineral solvents, notably, chloroform, benzene, toluene, pyridine (in which the polysiloxane has good solubility when hot) and carbon tetrachloride.

Transparent, uncolored films can be prepared from solutions of the polysiloxanes, for example, from solutions having 10 percent by weight of polymers in chloroform, carbon tetrachloride, or toluene.

The molecular weight of the polysiloxane depends to a great degree on the operative conditions adopted for its manufacture. It corresponds, in general to a value of inherent viscosity of 0.1 to 5.0 for solutions of said polymer.

The inherent viscosity of a polymer solution is given by the known relation, wherein $$\text{inherent viscosity} = \frac{\log e \left\{\frac{\text{viscosity of the solution}}{\text{viscosity of the solvent}}\right\}}{C}$$

where C is the concentration of the solution expressed in grams of polymer for 100 milliliters of solution, the viscosity being measured at 25°C, the concentration of the polymer in the solution being from 0.5 percent by weight.

The thermal stability of the polysiloxane according to the invention is excellent.

Differential calorimetric analysis thereof does not show any evidence of decomposition and thermogravimetric analysis in air or in a non-oxygen atmosphere, for example, nitrogen, shows that decomposition thereof commences in air only at temperatures above at least 400° to 500°C and in nitrogen at temperatures above 480° to 550°C. In air, the loss of weight is only 10 percent at a temperature of about 500°C and 50 percent at a temperature of about 600°C. In a nitrogen atmosphere, the loss of weight is 10 percent at a temperature of 550°C and 50 percent at a temperature of 650°C; At 900°C, 25 percent of the initial weight of the polymer remains.

The softening point of the polymer varies on the one hand according to the constituents of groups $R_1$, $R_2$, $R_3$ and $R_4$ and on the other hand according to the value of x.

Thus, for example, in the case where $R_1$ and $R_2$ are hydrogen, x is 0 and $R_3$ and $R_4$ are phenol, the polysiloxane has a softening point of about 160°C (the temperature at which a metallic filament penetrates a layer of polysiloxane contained in a capillary). The softening point is between 130° and 140°C when R is methyl group.

In the case where $R_1$ and $R_2$ are hydrogen and $R_3$ and $R_4$ are methyl, when x is 1, the softening point will be 45° to 55°C whereas when x is 2 the softening point will be about 12°C.

In the case where $R_1$ and $R_2$ are methyl, the values of the softening point decrease both by replacement of $R_3$ or $R_4$ from phenol to methyl and when X is increased, these values being greater than the corresponding values in the case where $R_1$ and $R_2$ are hydrogen as shown in the following table.

| $R_3$ and $R_4$ = ↓ / $R_1$ and $R_2$ → = | X = ↓ | Softening Point (°C) H | Softening Point (°C) $CH_3$ |
|---|---|---|---|
| $C_6H_5$ | 0 | 155 – 165 | 180 – 190 |
| $CH_3$ | 0 | 130 – 140 | 160 – 170 |
| $CH_3$ | 1 | 45 – 55 | 65 – 75 |
| $CH_3$ | 2 | ~12 | ~16 |

In the case where $R_1$ and $R_2$ are hydrogen, it is possible to effect reticulation of the polysiloxane by an appropriate treatment such as by heating in air, said heating being effected, for example, at a temperature between 220° and 240°C for 15 hours. Such reticulation renders the polymer unmeltable and insoluble in certain solvents in which the polymer would have been soluble before such reticulation, for example, chloroform. Additionally, the reticulation produces a diminution of the elasticity and flexibility of the polymer.

A further object of the invention is to provide a method of production of the polysiloxanes which have been described hereinabove.

This method is characterized by the reaction in equimolecular proportions of at least 1 bis-phenol having the formula

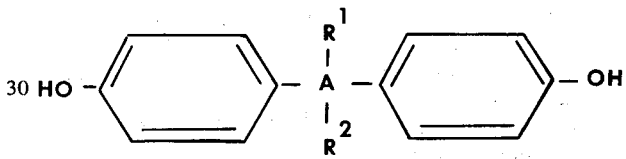

in which A represents an adamantyl group and $R_1$ and $R_2$ each is hydrogen, alkyl or aryl with at least one silicon compound having the formula

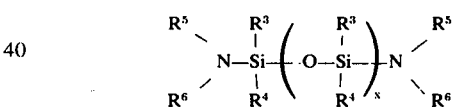

where $R_5$ and $R_6$ each is hydrogen, alkyl or aryl, $R_3$ and $R_4$ each is alkyl, alkylenyl or aryl and x is 0 or a whole number, in order to effect the polycondensation of the two compounds.

The bis-phenol having the formula

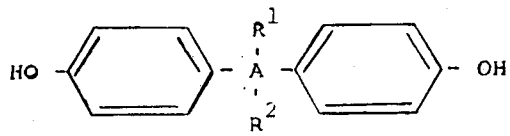

Can be:
bis-(p-hydroxyphenyl)-1,3-adamantane:

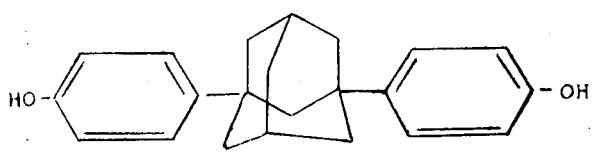

dimethyl-1,3-bis-(p-hydroxyphenyl)-5,7-adamantane:

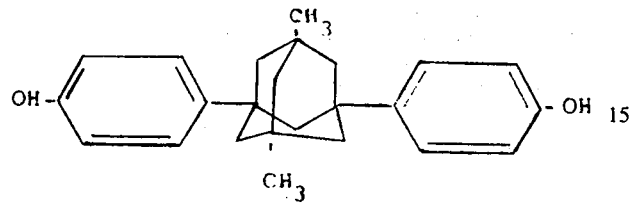

diethyl-1,3-bis-(p-hydroxyphenyl)-5,7-adamantane,
diphenyl-1,3-bis(p-hydroxyphenyl)-5,7-adamantane,
methyl-1 ethyl-3 bis-(p-hydroxyphenyl)-5,7-adamantane,
methyl-1-phenyl-3-bis-(p-hydroxyphenyl)-5,7-adamantane,
methyl-1-paratoluyl-3-bis-(p-hydroxyphenyl)-5,7-adamantane, etc.

The organic silicon compounds having the formula

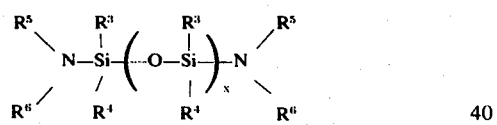

can be:
dianilino diphenyl-silane:

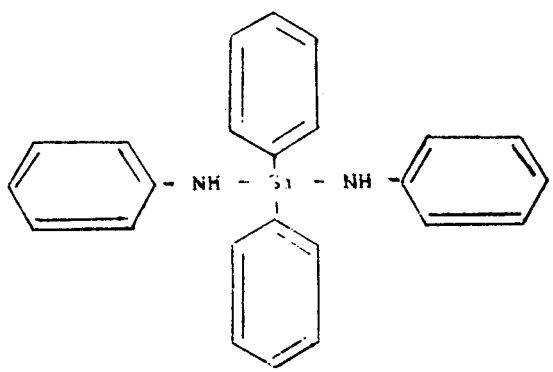

dianilinodimethylsilane:

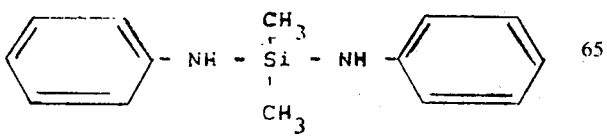

dianilino-1,3-tetramethyldisiloxane:

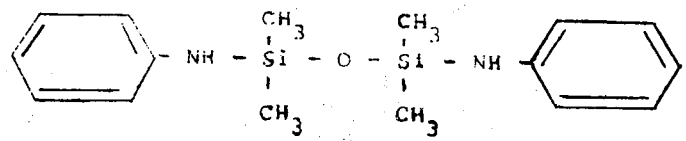

dianilino-1,5-hexamethyltrisiloxane:

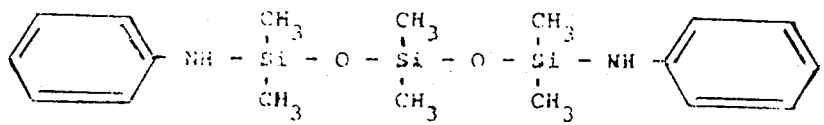

dianilinomethylphenylsilane, dianilino-1,3-diphenyl-1,3-dimethyl-1,3-disiloxane, dianilino-1,5-triphenyl-1,3,5-trimethyl-1,3,5-trisiloxane, dianilino-1,3-tetraphenyldisiloxane, dianilino-1, 5-hexaphenyltrisiloxane or a compound having one of the following formulas

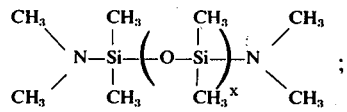

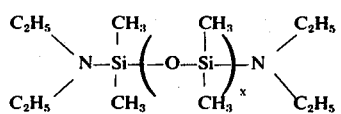

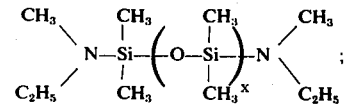

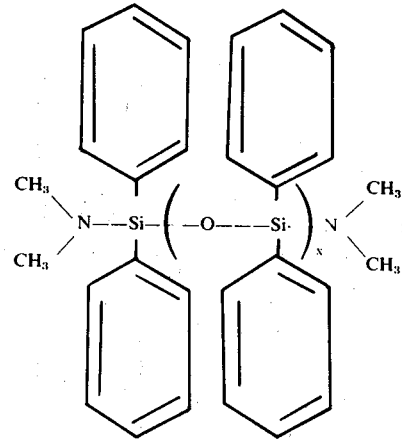

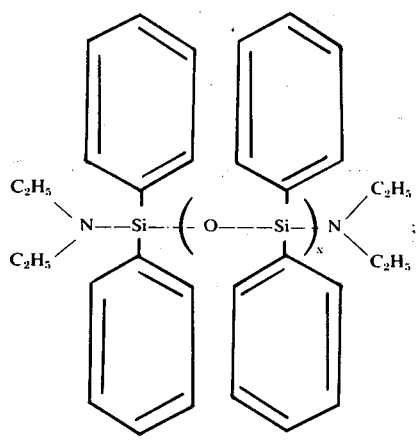

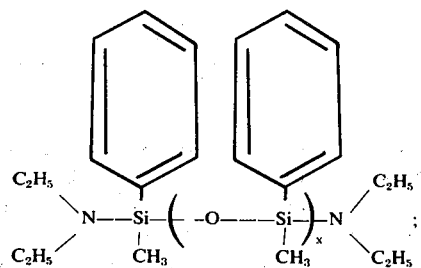

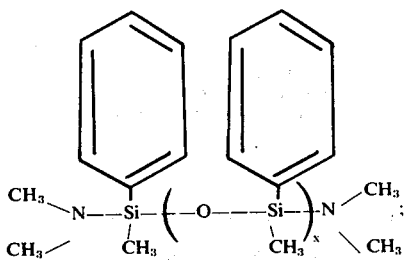

x being equal to 0, 1, 2 or 3.

In order to obtain a polysiloxane which is particularly adapted to hot vulcanization, there can be utilized in mixture with the organic silicon compound having the general formula indicated hereinabove and in which $R_3$ and $R_4$ are alkyl or aryl, a small proportion (for example, of the order of 0.1 to 1%) of a compound of the general formula in which at least one of the radicals $R_3$ or $R_4$ is alkylenyl, for example, vinyl. Such compound can be, for example, dianilinomethyl-vinyl-silane.

According to the ablity of the bis-phenol and the silicon compound of the general formula

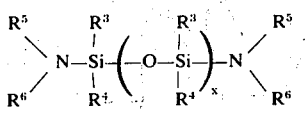

to react with one another, there can be effected a polycondensation reaction either by maintaining an equimolecular mixture of the compounds at a temperature at least equal to the melting point of the mixture for a sufficient time for the polycondensation to be completed, or by dissolving in equimolar portions the two compounds in an inert organic solvent, preferably a solvent forming an azeotrope with water such as toluene, tetrahydrofuran, chlorobenzene etc. and heating the solution thus obtained to a temperature and for a time sufficient to obtain complete polycondensation. The advantage obtained by the utilization of a solvent forming an azeotrope with water is the ability to eliminate water before introduction of the organic silicon compound in the course of the reaction. Thus, for example, in the case where the bis-phenol is bis-(p-hydroxyphenyl)-1,3-adamantane or dimethyl-1, 3-bis-(p-hydroxyphenyl)-5,7-adamantane, the polycondensation is preferably effected by melting in the case where the groups $R_1$ and $R_2$ of the compounds having the general formula indicated hereinbefore are respec-

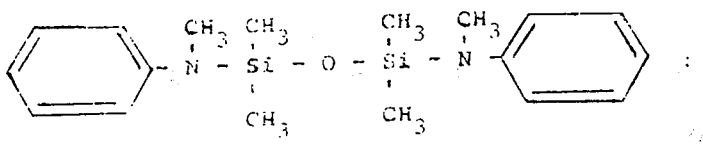

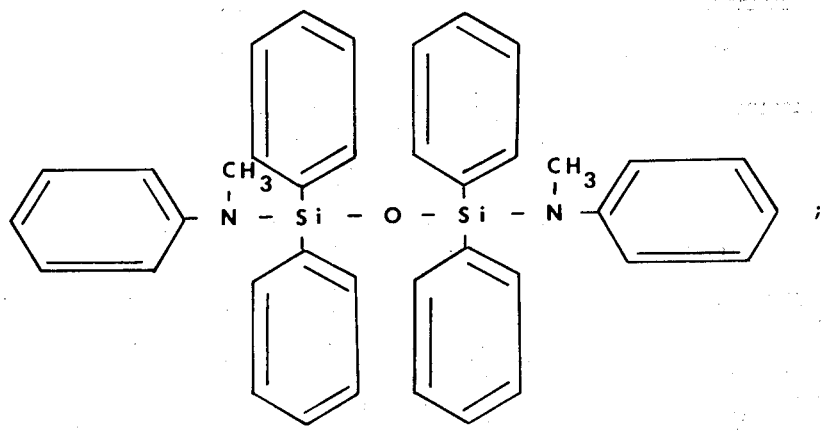

tively hydrogen and a phenol group (for example, when the compound is dianilinodiphenylsilane, dianilinodimethylsilane, dianilino-1,3-tetramethyldisiloxane or dianilino-1,5-hexamethyltrisiloxane).

In the case where $R_5$ and $R_6$ are each always alkyl, for example, when there is utilized bis-(dimethylamino)-diphenylsilane, bis-(diethylamino) diphenylsilane, bis-(dimethylamino)-dimethylsilane, bis-(N-methyl-N-ethylamino)-diphenylsilane, bis-(N-methyl-N-ethylamino)-dimethylsilane, bis-(N-dimethylamino)-1,3-tetramethyldisiloxane, bis-(N-dimethylamino)-1,3-tetraphenyldisiloxane, bis-(N-dimethylamino)-1,5 hexamethyltrisiloxane, etc., the polycondensation can be effected either by melting or in solution.

In order to effect the polycondensation by melting, the equimolar mixture of the compounds is heated to a temperature between 150° and 350°C for a time of 2 to 24 hours while maintaining the reaction in an environment free of oxygen and moisture, for example, by operating in a protective atmosphere constituted by an inert gas such as nitrogen, a noble gas or a mixture thereof, this atmosphere not including more than traces of oxygen and water vapor. Preferably the compounds having low molecular weight formed at the time of the polycondensaton, for example, aniline in the case where $R_1$ is hydrogen and $R_2$ phenyl are removed by passing a current of inert gas on the surface of the reaction mixture and even into the interior thereof before the viscosity becomes too great. Additionally, it is preferred to replace the reaction mixture under a suction pressure, for example, under a pressure of 10 mm Hg initially and then under a pressure 0.1 mm Hg at the end of treatment in order to eliminate the last traces of low molecular weight compounds formed at the time of polycondensation.

The molecular weight of the polymer obtained by melt polycondensation can be increased by subjecting it to a post treatment of polycondensation in the presence of an additional quantity of the organic silicon compound, the latter being present in the amount, for example, of about 5 percent by weight with respect to the quantity of the polymer obtained from the initial polycondensation.

The post-treatment can be effected by first dissolving the polymer to be treated in a suitable solvent, for example, chloroform, then dissolving a suitable quantity of the organic silicon compound in the thus obtained solution; the solvent is then evaporated and the mixture purged by means of a current of inert gas, for example, nitrogen and finally the product is heated to a temperature of 150° – 350°C for 2 to 24 hours under atmospheric pressure in a protective atmosphere, then for 2 to 24 hours under reduced pressure (for example, 0.1 mm Hg) always in the same temperature range.

In the case of solution polymerization, the post treatment is generally unnecessary as the obtained polymer has a high molecular weight.

To effect solution polymerization, the reaction medium is maintained at ambient temperature or heated to a temperature up to about 120°C.

To obtain the reacting compounds, the bis-phenol and the organic silicon compound, the procedure is as follows:

Preparation of the bis-phenol

The bis-phenol is obtained by reacting an excess of phenol (hydroxybenzene) with a dibromine derivative of an adamantane compound of the formula

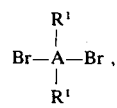

where $R_1$ and A have the meanings previously defined, the reaction being effected by simple heating in the absence of a catalyst, for example, the reaction of phenol and dibromo-1,3, -adamantane produces bis(p-Hydroxyphenyl)-1,3 adamantane having a melting point of 195°–198°C with a yield of 85 percent.

Preparation of the organic silicon compound

The organic silicon compound is obtained by reacting a dihalogenosilane or a dihalogenosiloxane having the formula

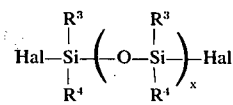

wherein $R_3$, $R_4$ and x have the meanings previously defined, with an amine of the general formula

wherein $R_5$ and $R_6$ have the meanings previously defined, in the presence of an acceptor of halogenohydric acid, such as symcollidine, trimethyl-2,4,6-pyridine, pyridine, triethylamine, etc. the reaction being effected in a suitable solvent such as benzene, or ether as, for example, diethyl ether.

By way of example, the reaction between aniline and dichlorodiphenylsilane produces dianilinodiphenylsilane in the form of a solid having, after recrystallization in benzene, a melting point between 160° and 163°C with a yield of 67 percent.

The reaction between aniline and dichlorodimethylsilane produces dianilinodimethylsilane in the form of a solid having, after recrystallization in hexane, a melting point between 59° and 60°C with a yield of 60 percent.

The reaction between aniline and dichloro-1,3-tetramethylsiloxane produces dianilino-1,3-tetramethyldisiloxane in the form of a liquid having a boiling point of 126.5°C at a pressure of $5 \times 10^{-3}$ mm Hg with a yield of 69.5 percent.

The reaction between aniline and dichloro-1,5-hexamethyltrisiloxane produces dianilino-1,5-hexamethyltrisiloxane in the form of a liquid having a boiling point of 133°C at a pressure of $5 \times 10^{-3}$ mm Hg with a yield of 48 percent.

The dichlorosiloxanes used in the processes described above can be obtained by reacting corresponding dichlorosilanes and absolute ethanol in the presence of a suitable catalyst such as ferric chloride. Thus, for example, dichloro-1,3,-tetramethyldisiloxane can be obtained in the form of a liquid having a boiling point of 41°C at a pressure of 20 mm Hg and dichloro-1,5, hexamethyltrisiloxane can be obtained in the form of a liquid having a boiling point of 64° to 67°C at a pressure of 13 mm Hg.

In order to hot vulcanize the polysiloxanes whose production has been described above, they are placed into contact with an organic peroxide. For example, the polysiloxanes are put into solution in a suitable organic solvent, such as, toluene, trichloroethylene, carbon tetrachloride, or the like and to the solution is added an organic peroxide in a small amount, of the order of 1 to 2 percent by weight with respect to the weight of the polysiloxane. After elimination of the solvent, the mixture is heated to a temperature between about 100° and 250°C for the time necessary to obtain complete vulcanization of the polysiloxane. The method can also be effected in the absence of the solvent.

The polysiloxanes according to the invention in which a small proportion, for example, about 0.1 to 1 percent of the radicals $R_3$ or $R_4$ is constituted by an alkylene, particularly vinyl, has a particularly good ability to be hot vulcanized. When such polysiloxanes are subjected to a hot vulcanization of the type described immediately hereinabove, the vulcanization proceeds uniformly and completely without any need for special precautions.

As suitable organic peroxides which can be utilized to effect hot vulcanization of the polysiloxanes according to the invention, there can be mentioned, for example, diaroylperoxides such as dibenzoylperoxide, di-p-chlorobenzoylperoxide, bis-2,4-dichlorobenzoylperoxide; dialkylperoxides such as di-tert-butylperoxide, dimethyl-2,5-di-(tert-butyl-peroxy)hexane, dimethyl-2,5-di(tert-butylperoxy)hexene-3; diarylperoxides such as dicumylperoxide and its derivatives; alklyl-aralkylperoxides such as tert-butyl-cumylperoxide, bis-(tert-butylperoxy-isopropyl)-1,4-benzene; alkyl-aroyl or alkyl-acylperoxides such as perbenzoate of tertbytyl, peroctoate of tertbytul; and other types of peroxides such as peroxysilanes and peroxycarbonate and the like.

In order to cold vulcanize the polysiloxanes according to the invention, these are reacted at ambient temperature with a mixture of a tri or tetrafunctional reticulation agent and a catalyst after subjecting them to a preparatory treatment to form silanol groups

at the extremity of the macromolecular chains of these polysiloxanes.

The reticulation agent can be, for example, a tri or a tetra-alkoxysilane or even a polyalkoxypolysiloxane, a tri or tetra-acetoxysilane or a polyacetoxypolysiloxane and the like.

The catalyst can be a diacylate of dialkyltin, for example, dilaurate of dibutyltin, diacetate of dibutyltin or even tin octoate and the like.

The preparatory treatment to form the silanol groups consists of hydrolyzing the terminal alkyl or aryl-aminosiloxane groups of the macromolecular chains of the polysiloxane. This treatment can be effected, for example, in solution in the following manner;

The polysiloxane is dissolved in an organic solvent which forms an azeotrope with water, for example, in toluene, benzene, tetrahydrofuran or the like and then about 1 percent by weight of water is added to the solution thus obtained. The product is then heated under reflux for a time sufficient to completely hydrolyze the terminal alkyl or aryl-aminosiloxane groups and finally the water is removed by azeotropic distillation of the final solution.

Vulcanization properly said can be effected by dissolving a suitable quantity of the reticulation agent and the catalyst in a solution of the polysiloxane in an organic solvent such as toluene. The polysiloxane is preliminarily treated by the hydrolysis operation as described hereinabove. The thus obtained solution is then poured onto a support in order to form a liquid layer whose thickness corresponds to the final desired thickness of the film of vulcanized polysiloxane. Finally, the solvent is allowed to evaporate, for example, at ambient temperature. In a variant, the process of evaporation of the solvent can be accelerated either by operating under reduced pressure or by moderate heating, for example, at 100°C. In the latter case, the process of vulcanization of the polysiloxane is itself accelerated. There is obtained thereby films of polysiloxane which are thermostable and elastomeric.

DESCRIPTION OF PREFERRED EMBODIMENTS

The invention will be described hereinafter in detail with reference to the following examples.

EXAMPLE 1

There is progressively formed in 60 minutes at 250°C under a nitrogen atmosphere at atmospheric pressure a mixture of 0.01 moles of bis-(p-hydroxyphenyl)-1,3,-adamantane (3.2043 g) and 0.01 moles of dianilinodiphenylsilane (3.6655 g) while continously stirring the mixture.

There is seen the evolution of aniline which is condensed and separated from the reaction medium by means of a distillation column.

The reaction medium is maintained for two hours at a temperature between 250° and 280°C. Its viscosity increases progressively such that at the end of the period of heating, it is no longer possible to continue the stirring. During the first half-hour of this period of heating, a stream of nitrogen at a high flow rate at atmospheric pressure is passed over the surface of the reaction medium so as to entrain the formed aniline, then for the remainder of this period, the pressure is first lowered to a value of 10 mm of Hg and then to a value of 0.1 mm Hg in order to eliminate the last traces of aniline.

The product, thus obtained, is cooled and solidifies in the form of a vitreous mass. This product is dissolved in chloroform and re-precipitated by introducing the thus obtained solution in an excess of methanol. There is thereby obtained a polysiloxane in the form of white filaments. After filtration, washing first by methanol then by ether and drying there are obtained 4.80 g of product which corresponds to a yield of 96 percent.

The polymer is soluble when cold in chloroform, carbon tetrachloride, and toluene, and in pyridine when hot. The polymer can easily form semi-flexible, transparent, and colorless films from solutions of 10 percent by weight thereof in chloroform, carbon tetrachloride or toluene.

The inherent viscosity of the polymer in solution in toluene is 0.19.

The molecular weight of the polymer can be increased by subjecting it to a polycondensation "post-treatment" as follows:

1 g of the polymer as prepared above is dissolved in 50 ml of chloroform and then there is dissolved therein 0.05 g of diphenyldianilinosilane (corresponding to 5 percent by weight of the polymer). When the dissolution is complete, the solvent is evaporated and all traces thereof are eliminated by entrainment in a nitrogen stream. The resulting mixture is heated to a temperature between 250° and 280°C and held at this temperature first for an hour in an nitrogen atmosphere at atmospheric pressure and then for two hours at a reduced pressure of 0.1 mm Hg.

After this treatment, the polysiloxane has an inherent viscosity of 0.43 (measured in solution in toluene).

Transparent, colorless films are prepared from solutions of 10 percent by weight of the polymer in chloroform, carbon tetrachloride or toluene. These films have a greater flexibility than those prepared from the polysiloxane not subjected to the post-treatment described above.

EXAMPLES 2-8

The procedure of Example 1 was repeated utilizing 0.01 moles of each of the following compounds

| Example | bis-phenol: | Organic silicon compound |
|---|---|---|
| 2 | bis-p-(hydroxyphenyl)-1,3-adamantane | dianilino-dimethyl-silane |
| 3 | " | dianilino-1,3-tetramethyldisiloxane |
| 4 | " | dianilino-1,5-hexamethyltrisiloxane |
| 5 | dimethyl-1,3-bis(p-hydroxyphenyl)-5,7-adamantane | dianilinodiphenyl-silane |
| 6 | " | dianilinodimethyl-silane |
| 7 | " | dianilino-1,3-tetra-methyldisiloxane |
| 8 | " | dianilino-1,5-hexa-methyltrisiloxane |

Polymers are obtained whose general properties are analogous to the polysiloxane obtainted in Example 1.

The inherent viscosity (measured in solution in toluene) of the polysiloxanes obtained in Examples 1–8 both when subjected to and not subjected to the post treatment of the supplemental polycondensation described in Example 1 is given in the following table along with the softening point of the polysiloxanes subjected to the post treatment.

| Example | Inherent viscosity before post-treatment | Inherent viscosity after post-treatment | Softening point °C |
|---|---|---|---|
| 1 | 0.19 | 0.43 | 155 – 165 |
| 2 | 0.28 | 0.38 | 130 – 140 |
| 3 | 0.20 | 0.38 | 45 – 55 |
| 4 | — | 0.20 | ~ 12 |
| 5 | 0.21 | 0.31 | 180 – 190 |
| 6 | 0.28 | — | 160 – 170 |
| 7 | 0.32 | 0.45 | 65 – 75 |
| 8 | 0.77 | 0.77 | ~ 15 |

These polysiloxanes have an excellent thermal stability as shown in the following tables which indicate the results of measurements effected by dynamic thermogravimetry, respectively, in air and nitrogen at a rate of heating of 3°/min.

The temperature at the beginning of decomposition and the temperature corresponding to a loss of weight of 5%, 10% and 50% (in air) are listed in the following table.

| Example | Temperature °C Beginning of decomposition | Temperature for loss of weight equal to: | | |
|---|---|---|---|---|
| | | 5% | 10% | 50% |
| 1 | 450 | 450 | 490 | 590 |
| 2 | 450 | 485 | 530 | 600 |
| 3 | 400 | 420 | 455 | 590 |
| 4 | 365 | 405 | 455 | 630 |
| 5 | 425 | 440 | 475 | 590 |
| 6 | 420 | 430 | 460 | 576 |
| 7 | 390 | 390 | 440 | 595 |
| 8 | 410 | 424 | 440 | 615 |

The temperature at the beginning of decomposition and temperatures corresponding to a loss of weight of 5%, 10% and 50% (in nitrogen) is given in the following table.

| Example | Temperature °C Beginning of decomposition | Temperature for loss of weight equal to: | | |
|---|---|---|---|---|
| | | 5% | 10% | 50% |
| 1 | 490 | 500 | 530 | 650 |
| 2 | 460 | 485 | 535 | 610 |
| 3 | 440 | 460 | 485 | 590 |
| 4 | 380 | 435 | 490 | 800 |
| 5 | 500 | 525 | 568 | 740 |
| 6 | 500 | 532 | 550 | 610 |
| 7 | 430 | 462 | 480 | 580 |
| 8 | 420 | 435 | 447 | 563 |

The polysiloxanes obtained from Examples 1-4 became unmeltable and insoluble in chloroform when they were subjected to heating in air at a temperature between 220° and 240°C. This treatment also served to render the polymers rigid with the exeption of the polysiloxane of Example 4 which lost its elasticity but retained a certain flexibility. These variations of physical properties indicate that the polysiloxane become reticulated by the thermal treatment.

In contrast, the same thermal treatment had no effect on the flexibility and elasticity of the polysiloxanes obtained from Examples 5 to 8.

EXAMPLE 9

Treatment by cold vulcanization

Five grams of polysiloxane obtained in the manner shown in Example 8 was dissolved in 50 ml of toluene and in the thus obtained solution, there was dissolved 0.065 g (1.3% by weight with respect to the polysiloxane) of the peroxide of dichloro-2,4-benzoyl. The toluene was then removed by evaporation under a pressure of 10 mm Hg and then the obtained mass was heated to a temperature of 120°C for 15 minutes. The vulcanization was terminated at a temperature of 220°C for 4 hours in a ventilated oven. There was obtained a polysiloxane which was thermostable and elastomeric.

EXAMPLE 10

A polysiloxane was prepared in the manner shown in

Example 8 but substituting a proportion of the dianilino 1,5-hexamethyl-trisiloxane equal to 0.3% in moles, by an equivalent quantity of dianilino-methyl-vinylsilane.

The polysiloxane thus obtained was hot vulcanized in a manner corresponding to that in Example 9 but utilizing as the peroxide 1% of dicumyl peroxide and while effecting the first heating stage at 150°C for 30 minutes. There was obtained a polysiloxane which was thermostable and elastomeric in the form of a particularly homogeneous mass notably from the point of view of its physical properties.

EXAMPLE 11

Treatment of cold vulcanization 5 gms of polysiloxane obtained in Example 8 was dissolved in 100 ml of toluene. To the thus obtained solution, there was added 2 ml of water and the product was heated under reflux for 3 minutes, then the liquid was subjected to an azeotropic distillation in order to eliminate the water whereupon the product was concentrated to a final volume of about 50 ml.

0.5 gm of tetraethoxysilane and 0.1 g of dibutyltin dilaurate were dissolved in the solution and then the solution was poured on a glass plate. The solvent was allowed to evaporate at ambient temperature and there was then obtained a polysiloxane film which was thermostable and elastomeric.

EXAMPLE 12

3.485 g (0.01 mole) of dimethyl-1,3-bis(p-hydrdoxyphenyl)-5,7-adamantane was dissolved in 75 ml of toluene at 70°C. There was then introduced into the thus obtained solution while maintaining it at 70°C, 2.704 g (0.01 mole) of dianilinodiphenylsilane while effecting this introduction in continuous manner for 30 minutes while energetically stirring the liquid medium. A release of gas was observed and thereafter the liquid medium was maintained at 70°C under constant stirring for 2 hours. Then while constantly maintaining the liquid at 70°C, the toluene was evaporated first under a pressure of 10 mm Hg and then under a pressure 0.1 mm Hg. The pasty mass thus obtained was cooled at ambient temperature and 100 ml of chloroform was dissolved therein. The solution thus obtained was poured into a liter of methanol which effected the precipitation of a polymer having the same properties as that obtained by the method of Example 5.

What is claimed is:

1. A polysiloxane consisting essentially of recurrent units forming a macromolecular chain having the formula

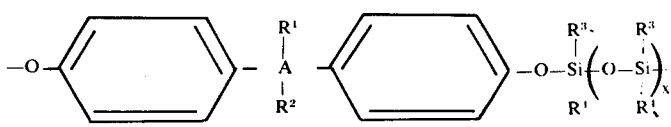

where A is adamantyl, $R_3$ and $R_4$ each is alkyl, alkenyl or aryl, $R_1$ and $R_2$ each is hydrogen, alkyl or aryl, and x is 0 or a whole number, the chain having end groups of the formulas

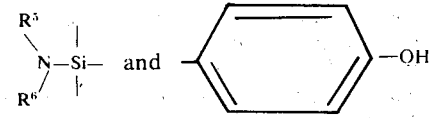

where $R_5$ and $R_6$ each is hydrogen, akyl, or aryl.

2. A polysiloxane as claimed in claim 1 wherein 99 to 99.9 percent of $R_3$ and $R_4$ are alkyl or aryl and 0.1 to 1 percent is alkenyl.

3. A polysiloxane as claimed in claim 2 wherein the alkenyl is vinyl.

4. A process of producing the siloxane of claim 1 comprising reacting in equimolecular amounts, at least one bis-phenol having the formula

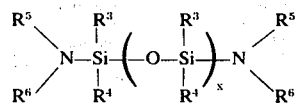

wherein A, $R_1$ and $R_2$ are as claimed in claim 1, with an organic silicon compound having the formula

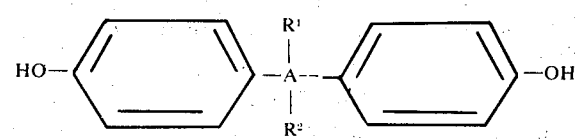

wherein $R_3$, $R_4$, $R_5$, $R_6$ and x are as claimed in claim 1, to effect polycondensation of the two compounds.

5. A process as claimed in claim 4 wherein the reacting is effected at a temperature at least equal to the melting point of the mixture of compounds for a period of time to effect complete polycondensation.

6. A process as claimed in claim 5 wherein the temperature is between 150° and 350°C and the time is 2 to 24 hours.

7. A process as claimed in claim 4 wherein the reacting is effected in an inert organic solvent.

8. A process as claimed in claim 7 wherein the reacting is effected at a temperature between ambient and 120°C.

9. A process as claimed in claim 7 wherein said solvent is toluene, tetrahydrofuran, or chlorobenzene.

10. A process as claimed in claim 9 wherein the reacting is effected at a temperature between ambient and 120°C.

* * * * *